(12) United States Patent
Lee et al.

(10) Patent No.: US 7,253,855 B2
(45) Date of Patent: Aug. 7, 2007

(54) LIQUID CRYSTAL DISPLAY DEVICES USING A PLASTIC SUBSTRATE WITH PARTICULAR RELATIVE THICKNESS

(75) Inventors: Yun-Bok Lee, Seoul (KR); Jong-Hoon Yi, Seoul (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/271,586

(22) Filed: Oct. 17, 2002

(65) Prior Publication Data

US 2003/0076456 A1    Apr. 24, 2003

(30) Foreign Application Priority Data

Oct. 18, 2001   (KR)   ............... 2001-64238

(51) Int. Cl.
*G02F 1/1335*   (2006.01)
(52) U.S. Cl. ..................................... 349/106
(58) Field of Classification Search ............... 349/106, 349/158, 96, 41–43, 110–111
See application file for complete search history.

(56) References Cited

U.S. PATENT DOCUMENTS

| | | | |
|---|---|---|---|
| 5,798,744 A * | 8/1998 | Tanaka et al. ................ | 345/92 |
| 6,157,426 A * | 12/2000 | Gu ............................ | 349/111 |
| 6,177,968 B1 * | 1/2001 | Okada et al. ................ | 349/38 |
| 6,191,835 B1 * | 2/2001 | Choi .......................... | 349/106 |
| 6,221,543 B1 * | 4/2001 | Guehler et al. ............... | 430/7 |
| 6,414,733 B1 * | 7/2002 | Ishikawa et al. ............. | 349/110 |
| 6,515,720 B1 * | 2/2003 | Iizuka et al. ................. | 349/39 |
| 6,597,420 B2 * | 7/2003 | Kim et al. ................... | 349/106 |
| 6,717,638 B1 * | 4/2004 | Kim ........................... | 349/106 |
| 6,731,358 B2 * | 5/2004 | Tanaka et al. .............. | 349/108 |
| 6,778,232 B2 * | 8/2004 | Nakata et al. ................ | 349/43 |
| 2002/0089615 A1 * | 7/2002 | Sakamoto et al. ............ | 349/43 |
| 2002/0113927 A1 * | 8/2002 | Ha et al. ..................... | 349/113 |
| 2002/0145688 A1 * | 10/2002 | Sekiguchi ................... | 349/114 |
| 2002/0182766 A1 * | 12/2002 | Yamamoto ................... | 438/30 |

FOREIGN PATENT DOCUMENTS

| JP | 59-191013 | * 10/1984 |
|---|---|---|
| JP | 10-039292 | * 2/1998 |

* cited by examiner

*Primary Examiner*—David Nelms
*Assistant Examiner*—T. L. Rude
(74) *Attorney, Agent, or Firm*—Birch, Stewart, Kolasch & Birch, LLP

(57) ABSTRACT

A liquid crystal display device includes a first substrate, a second substrate made of plastic and being spaced apart from the first substrate, a thin film transistor on the inner surface of the first substrate, a pixel electrode connected to the thin film transistor, a color filter layer under the pixel electrode, a polarizer on the outer surface of the second substrate, a black matrix on the inner surface of the second substrate and corresponding to the thin film transistor, a common electrode on the black matrix, and a liquid crystal layer between the pixel electrode and the common electrode.

8 Claims, 3 Drawing Sheets

LIQUID CRYSTAL DISPLAY DEVICES USING A PLASTIC SUBSTRATE WITH PARTICULAR RELATIVE THICKNESS

This application claims the priority benefit of Korean Patent Application No. 2001-64238, filed on Oct. 18, 2001 in Republic of Korea, which is hereby incorporated by reference for all purposes as if fully set forth herein.

BACKGROUND OF THE INVENTION

1. Field of the Invention

The present invention relates to liquid crystal display (LCD) devices and more particularly, to LCD devices using a plastic substrate.

2. Discussion of the Related Art

Flat panel display (FPD) devices having small size, light-weight, and low power consumption have been a subject of recent research in the coming of the information age. Among many kinds of FPD devices, LCD devices are widely developed and used for notebook and desktop personal computers (PC's) because of their excellent characteristics of resolution, color display and display quality.

Generally, an LCD device includes an upper substrate and a lower substrate facing each other with liquid crystal molecules interposed therebetween. Each substrate has an electrode on an inner surface thereof. An electric field is generated by applying a voltage to the electrodes, thereby driving the liquid crystal molecules to display images depending on light transmittance.

FIG. 1 is a schematic cross-sectional view of a conventional liquid crystal display device. As shown in FIG. 1, a first substrate 10 and a second substrate 20 are spaced apart from each other. The first substrate 10 and the second substrate 20 are also known as a lower substrate and an upper substrate, respectively. A gate electrode 11 is formed on an inner surface of the first substrate 10 and a gate insulating layer 12 is formed on the gate electrode 11. An active layer 13 is formed on the gate insulating layer 12 over the gate electrode 11, and an ohmic contact layer 14 is formed on the active layer 13. Source and drain electrodes 15a and 15b are formed on the ohmic contact layer 14 and constitute a thin film transistor (TFT) "T" along with the gate electrode 11. A passivation layer 16 is formed on the TFT "T." The passivation layer 16 has a contact hole 16c exposing the drain electrode 15b. A pixel electrode 17 of a transparent conductive material is formed on the passivation layer 16 and connected to the drain electrode 15b through the contact hole 16c.

A black matrix 21 corresponding to the TFT "T" is formed on an inner surface of the second substrate 20. A color filter layer 22a and 22b alternately having colors of red (R), green (G) and blue (B) is formed on the black matrix 21. A common electrode 23 made of a transparent conductive material is formed on the color filter layer 22a and 22b. Here, one color of the color filter layer 22a and 22b corresponds to one pixel electrode 17.

A liquid crystal layer 30 is interposed between the pixel electrodes 17 and the common electrode 23. When a voltage is applied to the pixel electrode 17 and the common electrode 23, an arrangement state of liquid crystal molecules of the liquid crystal layer 30 is changed by an electric field generated between the pixel electrode 17 and the common electrode 23. An orientation film (not shown) on each of the pixel electrode 17 and the common electrode 23 determines an initial alignment state of the liquid crystal molecules.

The conventional LCD device is fabricated through a process of forming the first substrate having the TFT and the pixel electrode, a process of forming the second substrate having the color filter layer and the common electrode, and a process of forming a liquid crystal cell. The process of forming the liquid crystal cell includes aligning the first and second substrates, injecting a liquid crystal material between the first and second substrates, sealing the LCD device, and attaching a polarizing plate to the LCD device. Here, the polarizing plate disposed on each outer surface of the first and second substrates 10 and 20 linearly polarizes natural light by transmitting light parallel to an optic axis of the polarizing plate. Since the liquid crystal cell does not emit light, an additional light source is necessary. Therefore, a backlight is disposed over the polarizing plate on the outer surface of the first substrate 10. Hence, the conventional LCD device displays images by using light emitted form the backlight and adjusting an amount of the light according to the alignment state of the liquid crystal molecule. Here, the pixel electrode 17 and the common electrode 23 generating the electric field are made of a transparent material. Moreover, the first and second substrates 10 and 20 are also made of a transparent material.

Generally, a glass substrate is used as the first and second substrates 10 and 20 in conventional LCD devices. However, since the glass substrate is heavy and fragile, it adds to the weight and cost of the LCD device and deteriorates the durability of the LCD device.

FIGS. 2A and 2B are schematic cross-sectional views showing loading states of a glass substrate and a plastic substrate, respectively. As shown in FIGS. 2A and 2B, a glass substrate 52 is closely loaded on a stage 51 of an apparatus due to its flatness and thus, the subsequent process is smoothly performed. On the other hand, a plastic substrate 62 is flexible and is not closely loaded on a stage 61.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display device having production cost, weight and thickness that are reduced without changing an apparatus and a condition of process by using a plastic substrate.

Additional features and advantages of the present invention will be set forth in the description which follows, and in part will be apparent from the description, or may be learned by the practice of the present invention. The objectives and other advantages of the present invention will be realized and attained by the structure particularly pointed out in the written description and claims hereof as well as the appended drawings.

To achieve these and other advantages and in accordance with the purpose of the present invention, as embodied and broadly described, a liquid crystal display device according to an embodiment of the present invention includes: a first substrate; a second substrate made of plastic and spaced apart from the first substrate; a thin film transistor on an inner surface of the first substrate; a pixel electrode connected to the thin film transistor; a color filter layer under the pixel electrode; a polarizer on an outer surface of the second substrate; a black matrix on an inner surface of the second substrate, and corresponding to the thin film transistor; a common electrode on the black matrix; and a liquid crystal layer between the pixel electrode and the common electrode.

In the liquid crystal display device, the color filter layer may be formed under the thin film transistor or over the thin film transistor. Moreover, a sum of the thickness of the second (upper) substrate and the thickness of the polarizer on the second substrate is equal to or substantially equal to the thickness of the first (lower) substrate. In one embodiment, the thickness of the first substrate is within a range of about 0.6 mm to about 1.0 mm and the thickness of the second substrate is within a range of about 0.13 mm to about 0.5 mm. The second substrate may be transparent and the first substrate may be transparent.

According to one embodiment, the present invention is directed to a method of forming a liquid crystal display device, comprising: forming a pixel electrode on a first substrate; forming a polarizer on one surface of a second substrate made of plastic; forming a common electrode on the other surface of the second substrate including the polarizer; attaching the first and second substrates such that the pixel electrode and the common electrode face each other; and injecting a liquid crystal material into a space between the pixel electrode and the common electrode.

It is to be understood that both the foregoing general description and the following detailed description are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this specification, illustrate embodiments of the invention and together with the description serve to explain the principles of the present invention, and wherein.

DETAILED DESCRIPTION OF THE PREFERRED EMBODIMENTS

Reference will now be made in detail to the illustrated embodiments of the present invention, as shown in the accompanying drawings.

Figure 1:
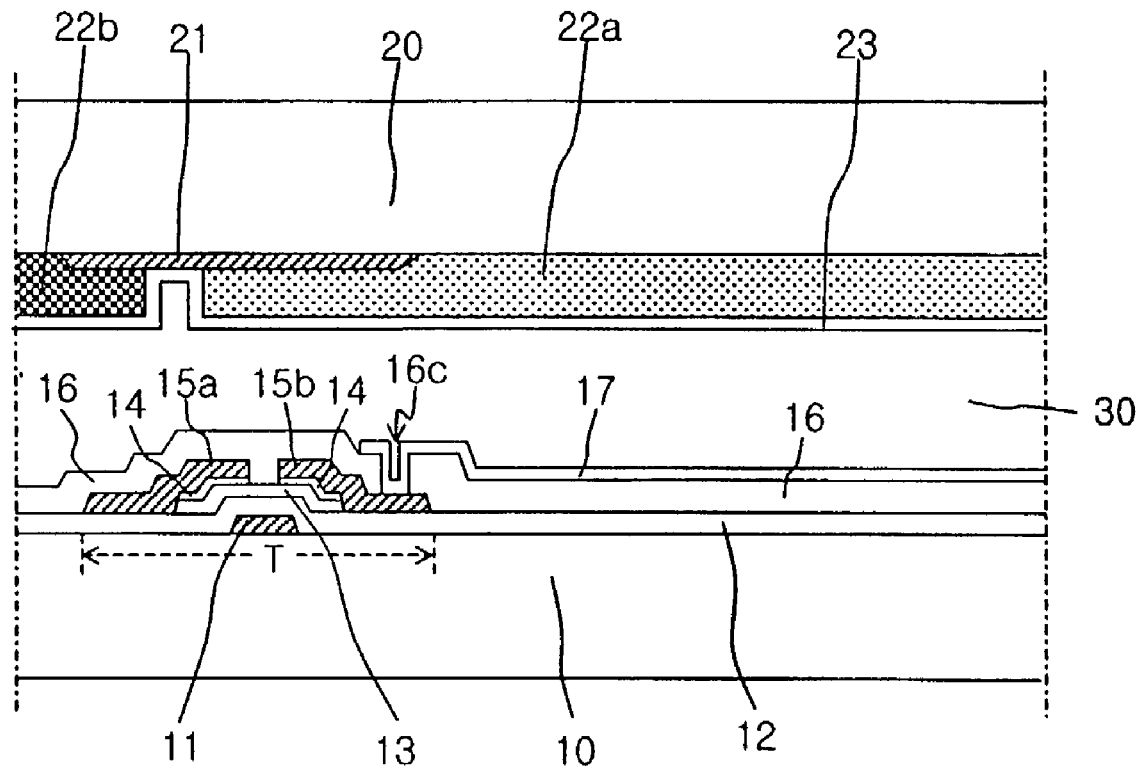
FIG. 1 is a schematic cross-sectional view of a conventional liquid crystal display device.
Figure 2A:
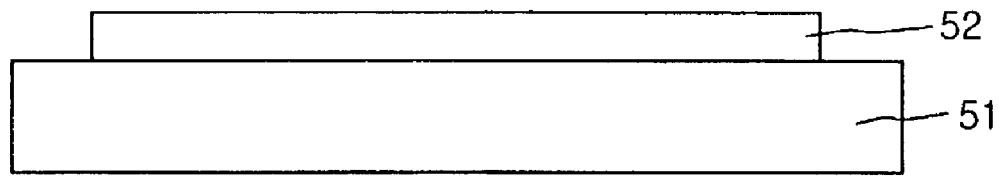
FIGS. 2A and 2B are schematic cross-sectional views showing loading states of a glass substrate and a plastic substrate, respectively.
Figure 2B:
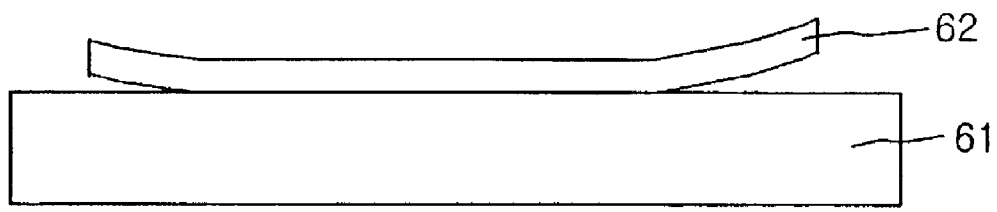
Figure 3:
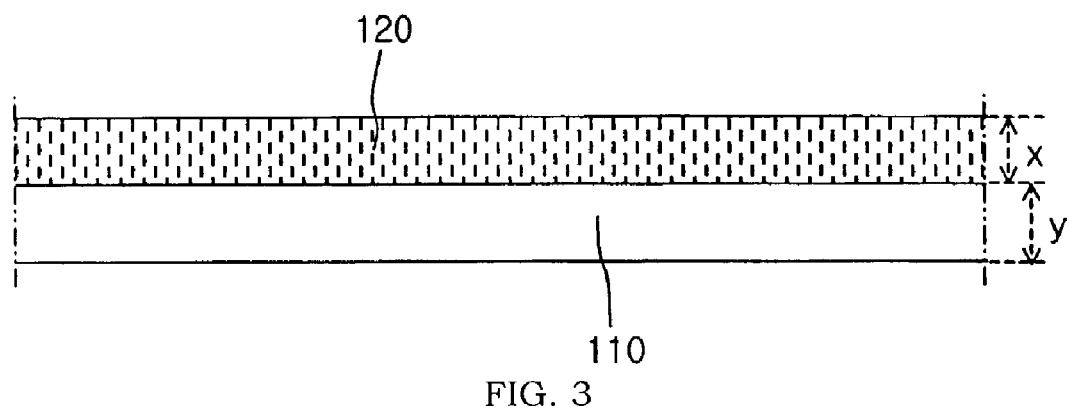
FIG. 3 is a schematic cross-sectional view of an upper substrate of a liquid crystal display device according to an embodiment of the present invention.

FIG. 3 is a schematic cross-sectional view of an upper substrate of a liquid crystal display device according to an embodiment of the present invention. As shown in FIG. 3, a linear polarizer 120 is formed on a transparent plastic substrate 110 usable in an LCD device. Here, a sum "x+y" of a thickness "x" of the linear polarizer 120 and a thickness "y" of the plastic substrate 110 is within a range of about 0.6 mm to about 1.0 mm. Preferably, the thickness "y" of the plastic substrate 110 is within a range of about 0.13 mm to about 0.5 mm. Other films are formed on the other surface of the plastic substrate 110, which will be discussed below.

In one embodiment, since the sum "x+y" of the thickness "x" of the linear polarizer 120 and the thickness "y" of the plastic substrate 110 is equal to or substantially equal to the thickness of a conventional glass substrate used as an upper/lower substrate of a conventional LCD device, the existing apparatuses and process condition can be used as they are. Since the plastic substrate is susceptible to heat, the plastic substrate may not be used as a lower substrate of an LCD device where several films are fabricated under a relatively high temperature. Therefore, the plastic substrate may be used only as an upper substrate of the LCD device according to one embodiment of the present invention.

In the fabrication process of a conventional LCD device, the lower substrate and the upper substrate are respectively formed and attached in such a way that the pixel electrode of the lower substrate corresponds to the color filter layer of the upper substrate. When attaching the lower substrate and the upper substrate, deterioration such as light leakage may occur due to misalignment. To prevent this deterioration, the black matrix of the upper substrate may be widened. However, as the black matrix becomes wider, the aperture ratio of the LCD device becomes lower.

Therefore, LCD devices having a new structure in which the color filter layer is disposed on the lower substrate is suggested according to the present invention. The new structure may be classified into two types: TFT on color filter (TOC) type and color filter on TFT (COT) type. In the structure of the TOC type, a color filter layer is formed under a TFT. In the structure of COT type, a color filter layer is formed over a TFT.

Figure 4:
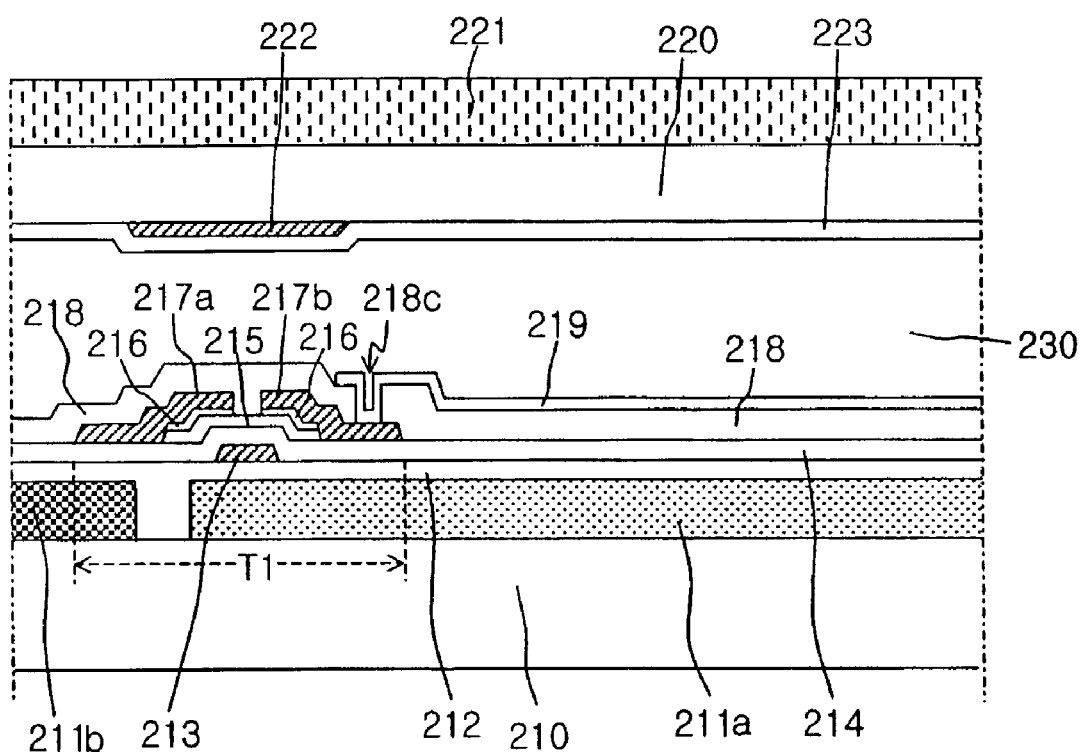
FIG. 4 is a schematic cross-sectional view showing an LCD device of TOC type according to an embodiment of the present invention.

FIG. 4 is a schematic cross-sectional view showing an LCD device of TOC type according to an embodiment of the present invention. As shown in FIG. 4, first and second substrates 210 and 220 face each other and are spaced apart form each other. Here, a transparent glass substrate and a transparent plastic substrate such as the plastic substrate 110 of FIG. 3 are used as the first and second substrates 210 and 220, respectively. A color filter layer 211a and 211b is formed on an inner surface of the first substrate 210. The color filter layer 211a and 211b has three colors of red (R), green (G) and blue (B) alternately. An overcoat layer 212 is formed on the color filter layer 211a and 211b. The overcoat layer 212 protects the color filter layer 211a and 211b and planarizes the top surface of the first substrate 210 having the color filter layer 211a and 211b so that subsequent processes can be stably performed. A gate electrode 213 made of a conductive material such as metal is formed on the overcoat layer 212 and a gate insulating layer 214 covers the gate electrode 213. An active layer 215 of amorphous silicon is formed on the gate insulating layer 214 over the gate electrode 213 and an ohmic contact layer 216 of impurity-doped amorphous silicon is formed on the active layer 215.

Source and drain electrodes 217a and 217b facing each other are formed on the ohmic contact layer 216. The source and drain electrodes 217a and 217b along with the gate electrode 213 constitute a thin film transistor (TFT) "T1". A passivation layer 218 having a contact hole 218c is formed on the source and drain electrodes 217a and 217b. The contact hole 218c exposes a portion of the drain electrode 217b. A pixel electrode 219 made of a transparent conductive material, e.g., indium-tin-oxide (ITO), indium-zinc-oxide (IZO), etc., is formed on the passivation layer 218 and electrically connected to the drain electrode 217b through the contact hole 218c.

A polarizer 221 is formed on an outer surface of the second substrate 220. Here, it is preferable that the sum of the thickness of the second substrate 220 and the thickness of the polarizer 221 is equal to or substantially equal to the thickness of the first substrate 210. Next, a black matrix 222 corresponding to the TFT T1 is formed on an inner surface of the second substrate 220. A common electrode 223 made of a transparent conductive material, e.g., ITO, IZO, etc., is formed on the black matrix 222.

A liquid crystal layer 230 is interposed between the pixel electrode 219 and the common electrode 223. An orientation film (not shown) is formed on each of the pixel electrode 219 and the common electrode 223. The orientation film determines an initial alignment state of liquid crystal molecule.

Figure 5:
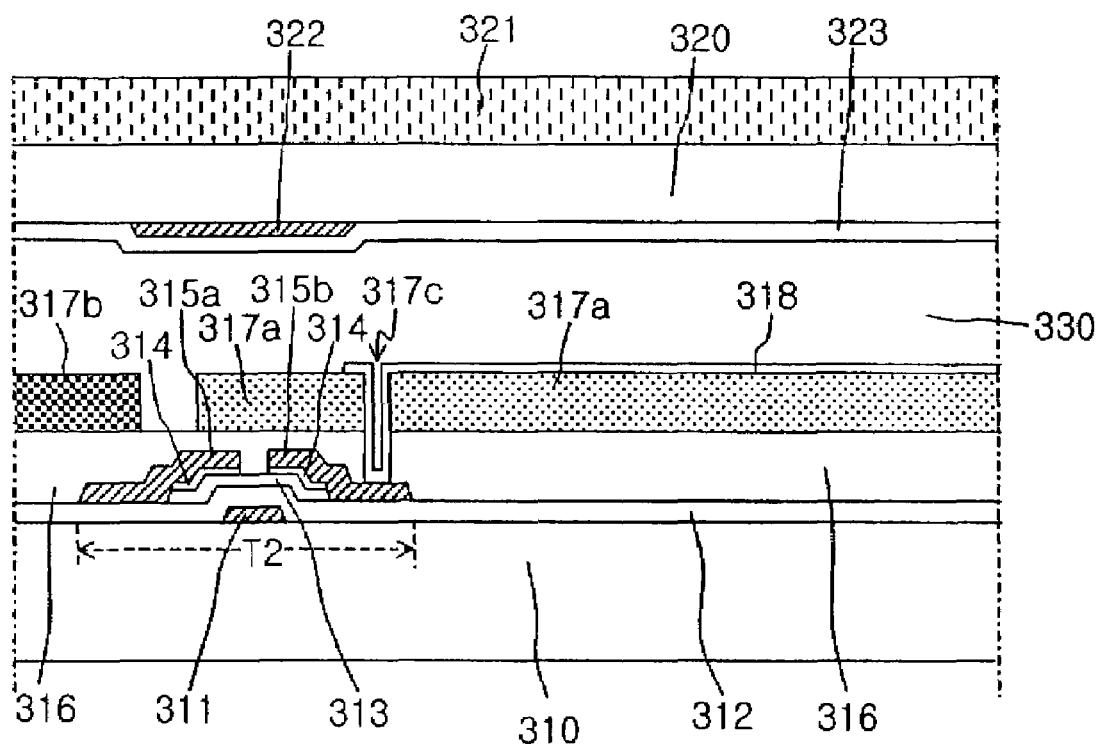
FIG. 5 is a schematic cross-sectional view showing an LCD device of COT type according to another embodiment of the present invention.

FIG. 5 is a schematic cross-sectional view showing an LCD device of COT type according to another embodiment of the present invention. As shown in FIG. 5, first and second substrates 310 and 320 face each other and are spaced apart from each other. Here, a transparent glass substrate and a transparent plastic substrate such as the plastic substrate 110 of FIG. 3 are used as the first and second substrates 310 and 320, respectively. A gate electrode 311 made of a conductive material such as metal is formed on an inner surface of the first substrate 310 and a gate insulating layer 312 covers the gate electrode 311. An active layer 313 made of, e.g., amorphous silicon is formed on the gate insulating layer 312 over the gate electrode 311 and an ohmic contact layer 314 made of, e.g., impurity-doped amorphous silicon is formed on the active layer 313. Source and drain electrodes 315a and 315b facing into each other are formed on the ohmic contact layer 314. The source and drain electrodes 315a and 315b along with the gate electrode 311 constitute a thin film transistor (TFT) "T2".

A passivation layer 316 is formed on the source and drain electrodes 315a and 315b. A color filter layer 317a and 317b is formed on the passivation layer 316. The color filter layer 317a and 317b has three colors of red (R), green (G) and blue (B) alternately. The color filter layer of one color corresponds one pixel region. Here, the color filter layer 317a over the drain electrode 315b has a contact hole 317c through the passivation layer 316. The contact hole 317c exposes a portion of the drain electrode 315b. Next, a pixel electrode 318 made of a transparent conductive material, e.g., as indium-tin-oxide (ITO), indium-zinc-oxide (IZO), etc., is formed on the color filter layer 317a and electrically connected to the drain electrode 315b through the contact hole 317c.

A polarizer 321 is formed on an outer surface of the second substrate 320. Here, it is preferable that a sum of the thickness of the second substrate 320 and the thickness of the polarizer 321 is equal to or substantially equal to the thickness of the first substrate 310. Next, a black matrix 322 corresponding to the TFT T2 is formed on an inner surface of the second substrate 320. A common electrode 323 made of a transparent conductive material, e.g., ITO, IZO, etc., is formed on the black matrix 322.

A liquid crystal layer 330 is interposed between the pixel electrode 318 and the common electrode 323. An orientation film (not shown) is formed on each of the pixel electrode 318 and the common electrode 323. The orientation film determines an initial alignment state of liquid crystal molecule.

Consequently, a liquid crystal display device according to the present invention is lightened by forming a polarizer on one surface of the upper plastic substrate and forming a common electrode on the other surface of the upper plastic substrate. Moreover, the liquid crystal display device can be fabricated without modifying existing apparatuses and conditions because the sum of the thickness of the upper plastic substrate and the thickness of the polarizer is equal to or substantially equal to the thickness of the lower glass substrate. Further, the aperture ratio of the liquid crystal display device is improved significantly by adopting color filter on thin film transistor (COT) type or thin film transistor on color filter (TOC) type where a color filter layer and a thin film transistor are formed on the same substrate.

Although the use of plastics for an upper substrate of an LCD device has been discussed, the present invention is not limited to such, and is applicable to other types of display devices having substrates.

It will be apparent to those skilled in the art that various modifications and variations can be made in the fabrication and application of the present invention without departing from the spirit or scope of the invention. Thus, it is intended that the present invention cover the modifications and variations thereof provided they come within the scope of the appended claims and their equivalents.

What is claimed is:

1. A backlit liquid crystal display device, comprising:
   a first substrate to be illuminated by a light source;
   a second substrate through which an image is to be viewed made of plastic and spaced apart from the first substrate;
   a thin film transistor on an inner surface of the first substrate;
   a passivation layer covering the thin film transistor;
   a pixel electrode and a color filter layer, both on the first substrate, the pixel electrode being disposed on a surface of the passivation layer and connected to the thin film transistor through a contact hole, the color filter layer being located between the first substrate and the pixel electrode;
   a polarizer on an outer surface of the second substrate;
   a black matrix on an inner surface of the second substrate, and corresponding to the thin film transistor;
   a common electrode on the black matrix; and
   a liquid crystal layer between the pixel electrode and the common electrode;
   wherein the black matrix is disposed between the second substrate and the common electrode; and
   wherein a sum of a thickness of the second substrate and a thickness of the polarizer is substantially equal to a thickness of the first substrate.

2. The device according to claim 1, wherein the thickness of the first substrate is within a range of about 0.6 mm to about 1.0 mm.

3. The device according to claim 2, wherein the thickness of the second substrate is within a range of about 0.13 mm to about 0.5 mm.

4. The device according to claim 1, wherein the second substrate is transparent.

5. The device according to claim 4, wherein the first substrate is transparent.

6. The device according to claim 1, wherein the color filter layer has multiple colors, each of the colors corresponding to the pixel electrode.

7. The device according to claim 1, wherein the color filter layer is formed between the second substrate and the thin film transistor.

8. The device according to claim 1, wherein the color filter layer is formed on the side of the thin film transistor that faces away from the first substrate.

* * * * *